(12) United States Patent
Slark et al.

(10) Patent No.: US 8,796,348 B2
(45) Date of Patent: Aug. 5, 2014

(54) UV CURABLE COATING COMPOSITION

(75) Inventors: Andrew Trevithick Slark, Berkshire (GB); Mireia Diaz Simo, Barcelona (ES)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 11/861,486

(22) Filed: Sep. 26, 2007

(65) Prior Publication Data

US 2009/0082485 A1 Mar. 26, 2009

(51) Int. Cl.
  *C08G 18/04* (2006.01)
  *C08F 299/06* (2006.01)
  *C08L 75/14* (2006.01)

(52) U.S. Cl.
  USPC ............. 522/153; 522/90; 522/95; 522/96; 525/28; 525/445

(58) Field of Classification Search
  USPC ............ 522/71, 74, 90, 94, 153, 162, 95, 96; 525/28, 445
  See application file for complete search history.

(56) References Cited

U.S. PATENT DOCUMENTS

| | | | |
|---|---|---|---|
| 4,078,015 A * | 3/1978 | Leitheiser et al. ....... | 525/440.07 |
| 4,990,364 A | 2/1991 | Bolte et al. | |
| 5,368,943 A * | 11/1994 | Baghdachi et al. ........ | 428/423.1 |
| 5,951,911 A * | 9/1999 | Venham et al. ............ | 252/182.2 |
| 6,284,321 B1 * | 9/2001 | Brindoepke et al. ....... | 427/385.5 |
| 2003/0138733 A1 * | 7/2003 | Sachdev et al. ............... | 430/311 |
| 2003/0176527 A1 | 9/2003 | Votteler et al. | |
| 2004/0138326 A1 | 7/2004 | Arnold et al. | |
| 2004/0209003 A1 * | 10/2004 | Lindell et al. .................. | 427/551 |
| 2004/0236053 A1 * | 11/2004 | Chisholm et al. ........... | 526/329.7 |
| 2005/0080163 A1 * | 4/2005 | Schmidt et al. ............... | 523/160 |
| 2005/0271973 A1 | 12/2005 | Ziegler et al. | |
| 2006/0083864 A1 * | 4/2006 | Lindell et al. .................. | 427/508 |
| 2007/0128365 A1 * | 6/2007 | Koch et al. ..................... | 427/299 |

FOREIGN PATENT DOCUMENTS

| | | |
|---|---|---|
| DE | 19535935 | 4/1997 |
| DE | 19806136 | 8/1998 |
| DE | 10310889 | 9/2004 |
| EP | 1469036 | 10/2004 |
| JP | 04107144 A * | 4/1992 |
| JP | 09048830 | 2/1997 |
| WO | 2008049805 | 5/2008 |

OTHER PUBLICATIONS

Derwent Summary Abstract of JP04-107144.*
Radcure Energy Curable Resins Product Guide, 2006.*

* cited by examiner

*Primary Examiner* — Michael Pepitone
(74) *Attorney, Agent, or Firm* — James E. Piotrowski

(57) ABSTRACT

The invention provides an isocyanate free UV curable hot melt composition which may be hardened upon exposure to UV radiation to provide a protective coating. The coating is particularly useful in wood-working and furniture applications.

18 Claims, No Drawings

UV CURABLE COATING COMPOSITION

FIELD OF THE INVENTION

The invention relates to solvent-free radiation curable coating compositions, in particular UV curable hot melt coating compositions. The compositions may be used to coat wood, metal, plastic, ceramic, fabric, foam, composite surfaces and the like.

BACKGROUND OF THE INVENTION

Coatings are often applied to substrates to protect them against environmental damage and protect their lifetime, e.g., for scratch resistance, abrasion resistance and solvent/water resistance, or to provide a decorative finish.

Historically, protective materials comprising thermoplastic and thermosetting polymers were applied from solvents which were subsequently removed by evaporation. However, changing safety, health and environment legislation have restricted solvent emissions. Solvent recycling processes have been used but these processes are expensive to install and operate, and are not 100% effective. Therefore, solvent-free coating materials and lacquers have become known. Particularly favourable are coating materials and lacquers which are UV curable because crosslinking is very fast compared to other methods, such as moisture curing or thermal curing. Typical UV lacquers or varnishes are applied at room temperature and consist of epoxy acrylate, polyester acrylate or urethane acrylate oligomers combined with acrylate functional monomers in the presence of a photoinitiator. Under suitable UV wavelengths, the photoinitiators produce free-radicals which polymerise the acrylate functional groups to produce a crosslinked network. Relatively high concentrations of low viscosity reactive monomers have to be used to reduce the viscosity of the coating composition in order to get good flow and levelling at room temperature. In addition, these low viscosity, low molecular weight monomers, e.g., hexanediol diacrylate (HDDA), tripropylene glycol diacrylate (TPGDA) and hydroxyl ethyl methacrylate (HEMA), can penetrate into porous substrates such as wood and then become too deep to be cured by UV radiation. Uncured monomer in the pores of substrates can give safety, health and environmental problems, e.g., when the materials are cut or sanded.

In order to protect substrates in wood-working and furniture applications, UV-curable varnishes are often used and applied by roller, or sometimes by spraying. However, quite often three to four layers of varnish are applied. Typically, only layers of 10 to 20 μm thick can be applied due to the low viscosity and each layer requires sanding before application of the next. The process is time consuming, expensive and requires lots of space.

The use of a solvent-free reactive hot melt layer based on polyurethane and hardened by atmospheric humidity has been suggested. While this method is advantageous in that desired layer thicknesses can be applied in a single operation, curing takes at least several days to occur because it depends on moisture and the coated part cannot be processed or packaged rapidly.

This problem may be reduced by either applying a layer of hot melt that can be cured through both radiation and moisture or by applying a UV curable lacquer on top of the moisture curable hot melt. In the former method, the polyurethane hot melt partly cures via UV radiation enabling handling/processing and then the complete curing of the melt mass takes place via moisture. In the latter method, the surface UV lacquer is immediately dry but the bulk of the hot melt coating still requires at least several days to cure via moisture. As with the use of any moisture curable polyurethane hot melt, use of a dual UV/moisture cure system requires use of a material that must be packaged in a special way—i.e., in the absence of moisture (e.g., under vacuum in expensive metal/plastic packaging that is a moisture barrier). Another problem is that when the material is heated and applied from a roller coater, thermal stability is limited. This results from moisture from the atmosphere penetrating the adhesive and reacting with the isocyanate groups. This leads to an increase in molecular weight while on the roller and application problems, e.g., stringing or filament formation that can produce fouling of substrates/application equipment.

There continues to be a need in the art for alternative types of coating compositions. The current invention addresses this need.

SUMMARY OF THE INVENTION

The invention provides radiation curable hot melt coating compositions and articles comprising a radiation cured hot melt coating.

One embodiment of the invention is directed to an isocyanate free radiation curable hot melt coating composition. In one aspect of the invention, the coating composition comprises a polymer component, an oligomer component, and a photinitiator component. In another aspect of the invention, the coating composition comprises a polymer component, a monomer component, and at least one photinitiator. In still another aspect of the invention, the coating composition comprises a polymer component, an oligomer component a monomer component, and at least one photinitiator.

The coatings of the invention are advantageously used to protect substrate surfaces. Non-limiting examples include use in, e.g., wood-working and furniture applications although this is not exclusive.

In one embodiment, the isocyanate free coating composition comprises a UV curable hot melt coating comprising:

a polymer component with number average molecular weight (Mn)>2,000 g per mole comprising polyurethane and/or poly(meth)acrylate segments and at least one functional group polymerisable under UV radiation;

an oligomeric component with Mn=500 to 5,000 g per mole and at least two functional groups polymerisable under UV radiation; and at least one photoinitiator.

The UV curable composition of the invention may, either in place of or in addition to the oligomeric component also comprise a monomer component with Mn=100 to 1,000 g per mole and at least one functional group polymerisable under UV radiation.

Optionally, the composition may also comprise an organic or inorganic filler. Other optional additives and various combinations thereof may also be used.

Another embodiment of the invention is directed to articles of manufacture comprising a radiation cured coating that is permanently adhered at least one substrate surface of the article. Coated articles of the invention include but are not limited to furniture, countertops, flooring panels, doors, architectural panels, decorative panels, automotive applications. The coating composition may be used in textile bonding applications (carpet and clothing), in the manufacture of footwear (shoes), and in coating of ceramics and tiles. Coated articles may be prepared by applying at least one layer of the isocyanate free radiation curable hot melt coating composition on to a substrate surface, and irradiating with UV light. In one preferred embodiment, coated articles are prepared by applying at least one layer of the isocyanate free radiation curable hot melt coating composition on to a substrate surface, optionally irradiating with UV light, applying at least one radiation curable UW lacquer on top of the radiation curable hot melt coating and irradiating with UV light. By way of example, substrates that may be coated comprise wood, plastic, metal, glass, ceramic, veneer, fibre board, foam, fabric.

DETAILED DESCRIPTION OF THE INVENTION

The invention relates to a UV curable hot melt composition which (i) can be made and packaged without special precautions to eliminate moisture; (ii) can be applied easily at relatively low application temperatures, e.g., <110° C.; (iii) is very thermally stable for many hours during application compared to other UV or dual UV/moisture cure compositions; (iv) is easy to use and allows easy cleaning of application equipment (v) has a melt viscosity and application temperature which produces smooth coatings via optional preheating and does not necessitate use of specialised smoothing rollers (although the use thereof may be desirable depending on formulation and/or specific application end use); (vi) can be applied to the substrate as one coating, as multiple coatings or as one coating followed by a UV lacquer and (vii) provides suitable protection of the substrate, i.e., scratch, abrasion, solvent and UV resistance.

It has now been discovered that radiation curable hot melts, in particular UV curable hot melts, may advantageously be used to prepare protective coating compositions.

The term "radiation-curable hot melt" as used herein means a composition which is curable upon exposure to actinic and/or ionizing radiation. The term "radiation" is used herein to include actinic radiation such as ultraviolet radiation and ionizing radiation created by the emission of electrons or highly accelerated nuclear particles such as neutrons, alpha-particles, etc.

Radiation curable hot melts useful in the practice of the invention will comprise components that contain bonds activatable by ultraviolet radiation, or a mixture of any combination of such components. Examples of bonds activatable by ultraviolet radiation are carbon-hydrogen single bonds or carbon-carbon, carbon-oxygen, carbon-nitrogen, carbon-phosphorus or carbon-silicon, single or double bonds. Double bonds are preferred, with the carbon-carbon double bonds being most preferred.

The compositions of the invention will contain a polymer component which has a Mn greater than 2,000 g per mole. In one preferred embodiment the polymer component will have a Mn greater than 5000 g per mole, more typically a Mn within the range of from 5,000 to 100,000 g per mole. The polymer component comprises polyurethane and/or poly (meth)acrylate segments and at least one functional group polymerisable under UV radiation. In one embodiment the polymer component comprises polyurethane segments. In another embodiment the polymer component comprises poly (meth)acrylate segments. In another embodiment, the polymer component comprises polyurethane and poly(meth)acrylate segments. The polyurethane and poly(meth)acrylate segments may be a physical blend of separate polymers that are compatible or may be chemically linked by covalent bonds.

Most commonly, the polyurethane segments are typically prepared by initially reacting a mixture of polyols with a molar excess of polyisocyanate to make an isocyanate terminated prepolymer, by most preferably the polymerization of a diisocyanate with a diol. This isocyanate terminated prepolymer is further reacted, typically with one compound capable of reacting with the isocyanate groups and containing at least one olefinically unsaturated group. In one preferred embodiment all of the isocyanate groups are reacted and the final polyurethane does not contain any isocyanate functional groups.

Any suitable compound which contains two or more isocyanate groups may be used for preparing the urethane prepolymers. Typically from about 5 to about 25 parts by weight of an isocyanate is used. There are no restrictions regarding the isocyanates which can be used, as long as it contains at least two isocyanate groups, such as alkylene diisocyanates, cycloalkylene diisocyanates, aromatic diisocyanates and aliphatic-aromatic diisocyanates. Specific examples of suitable isocyanate-containing compounds include, but are not limited to, ethylene diisocyanate, ethylidene diisocyanate, propylene diisocyanate, butylene diisocyanate, trimethylene diisocyanate, hexamethylene diisocyanate, hydrogenated 4,4'-methylenebis(phenyl)socyanate) (HMDI) and isophorone diisocyanate (IPDI), dichlorohexamethylene diisocyanate, furfurylidene diisocyanate, cyclopentylene-1,3-diisocyanate, cyclo-hexylene-1,4-diisocyanate, cyclohexylene-1,2-diisocyanate. Others include the various isomers of toluene diisocyanate such as 2,4-toluene diisocyanate, 2,6-toluene diisocyanate and/or mixtures of 2,4- and 2,6-toluene diisocyanate and/or its trimer, meta-xylenediioscyanate and para-xylenediisocyanate, 4,4'-diphenylmethane diisocyanate, 2,4'-diphenylmethane diisocyanate, 2,2-diphenylpropane-4,4'-diisocyanate, tetramethyl xylene diisocyanate,1,4-naphthylene diisocyanate, 1,5-naphthylene diisocyanate, m-phenylene diisocyanate, p-phenylene diisocyanate, diphenyl-4,4'-diisocyanate, azobenzene-4,4'-diisocyanate, diphenylsulphone-4,4'-diisocyanate, 1-chlorobenzene-2,4-diisocyanate, 4,4',4"-triisocyanatotriphenylmethane, 1,3,5-triisocyanatobenzene, 2,4,6-triisocyanatotoluene, 4,4'-dimethyldiphenyl-methane-2,2',5,5-tetratetraisocyanate, 4-chloro-1,3-phenylene diisocyanate, 1,5-tetrahydro-naphthalene diisocyanate, 4,4'-dibenzyl diisocyanate and 1,2,4-benzene triisocyanate, 1-methoxyphenyl-2,4-diisocyanate, mixtures of 4,4'-biphenyl diisocyanate, 3,3'-dimethyl-4,4'-biphenyl diisocyanate, 3,3'-dimethyl-4,4'-biphenyl diisocyanate and 3,3'-dimethyldiphenyl methane-4,4'-diisocyanate and the like. While such compounds are commercially available, methods for synthesizing such compounds are well known in the art. Suitable polymeric polyisocyanates include cycloaliphatic and/or aromatic polyisocyanates and/or polymethylene polyphenylenes polyisocyanates (polymeric MDI). Included within the useable isocyanates are those modifications containing carbodiimide, allophonate, urethane or isocyanurate structures. These polyisocyanates are prepared by conventional methods known in the art, e.g., phosgenation of the corresponding organic amine. Preferred isocyanate-containing compounds are methylene-bis(phenyldiisocyanate) (MDI; 2,4'-MDI, 4,4'-MDI and polymeric MDI), isophorone diisocyanate (IPDI) and/or its trimer, toluene diisocyanate (TDI) and/or its trimer, hydrogenated 4,4'-methylenebis(phenylisocyanate) (HMDI) and/or hexanediisocyanate (HDI) and/or its trimer and/or tetramethylxylylene diisocyanate (TMXDI). In order to minimise yellowing of resulting coating compositions exposed to sunlight, aliphatic polyfunctional isocyanates IPDI, HMDI and HDI are particularly preferred.

Typical polyols are end functional polymers with molecular weights typically varying from 400-12,000 g per mole. The polyols used include polyhydroxy ethers (substituted or unsubstituted polyalkylene ether glycols or polyhydroxy polyalkylene ethers), polyhydroxy polyesters, the ethylene or propylene oxide adducts of polyols and the monosubstituted esters of glycerol, as well as mixtures thereof. Examples of polyether polyols include a linear and/or branched polyether having plural numbers of ether bondings and at least two hydroxyl groups, and contain substantially no functional group other than the hydroxyl groups. Examples of the polyether polyol may include polyoxyalkylene polyol such as polyethylene glycol, polypropylene glycol, polybutylene glycol and the like. Further, a homopolymer and a copolymer of the polyoxyalkylene polyols may also be employed. Particularly preferable copolymers of the polyoxyalkylene polyols may include an adduct of at least one compound selected from the group consisting of ethylene glycol, propylene glycol, diethylene glycol, dipropylene glycol, triethylene glycol, 2-ethylhexanediol-1,3, glycerin, 1,2,6-hexane triol, trimethylol propane, trimethylol ethane, tris(hydroxyphenyl)propane, triethanolamine, tri isopropanolamine, ethylenediamine and ethanolamine; with at least one compound selected from the group consisting of ethylene oxide, propylene oxide and butylene oxide. Commercially available polyols which may be used in the practice of the invention include polyethers such as ARCOL PPG 2025 (Bayer), Acclaim 4200 (Bayer) PolyG 20-56 (Arch), Pluracol P-2010 (BASF), and Voranol P400, P725, P1000, P2000, and P4000 (Dow).

Other polyols used include polyester polyols which are formed from the condensation of one or more polyhydric alcohols typically having from 2 to 15 carbon atoms with one or more polycarboxylic acids typically having from 2 to 14 carbon atoms, although carbon chain lengths can be longer. Examples of suitable polyhydric alcohols include ethylene glycol, propylene glycol such as 1,2-propylene glycol and 1,3-propylene glycol, glycerol, pentaerythritol, trimethylolpropane, 1,4,6-octanetriol, butanediol, pentanediol, hexanediol, decane diol, dodecanediol, octanediol, chloropentanediol, glycerol monallyl ether, glycerol monoethyl ether, diethylene glycol, 2-ethylhexanediol-1,4, cyclohexanediol-1, 4,1,2,6-hexanetriol, 1,3,5-hexanetriol, 1,3-bis-(2-hydroxyethoxy)propane, and the like. Examples of polycarboxylic acids include phthalic acid, isophthalic acid, terephthalic acid, tetrachlorophthalic acid, maleic acid, dodecylmaleic acid, octadecenylmaleic acid, fumaric acid, aconitic acid, trimellitic acid, tricarballylic acid, 3,3'-thiodipropionic acid, succinic acid, adipic acid, suberic acid, azelaic acid, malonic acid, glutaric acid, pimetic acid, sebacic acid, cyclohexane-1,2-dicarboxylic acid, 1,4-cyclohexadiene-1,2-dicarboxylic acid, 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid. Dimer fatty acids can also be used—these are well known in the art and refers to the dimerisation product of mono- or polyunsaturated acids and/or esters thereof. Preferred dimer fatty acids are dimers of $C_{10}$- to a $C_{30}$, more preferably $C_{12}$- to a $C_{24}$, particularly $C_{14}$— to a $C_{22}$ and especially $C_{18}$ alkyl chains. Suitable dimer fatty acids include the dimerisation products of oleic acid, linoleic acid, linolenic acid, palmitoleic acid and elaidic acid. The dimerisation products of the unsaturated fatty acid mixtures obtained in the hydrolysis of natural fats and oils, e.g., sunflower oil, soybean oil, olive oil, rapeseed oil, cottonseed oil and tall oil may also be used. In addition to the dimer fatty acids, dimerisation usually results in varying amounts of oligomeric fatty acids (so called "trimer") and residues of monomeric fatty acids (so-called "monomer"), or esters thereof, being present. Suitable dimer fatty acids have a dimer acid content greater than 60%, preferably greater than 75%, more preferably in the range 90 to 99.5%, particularly 95 to 99%, and especially 97 to 99%. Commercially available polyesters which may be used in the practice of the invention include crystalline and amorphous materials such as Dynacoll 7360, 7380, 7330, 7231, 7250 (Degussa), Rucoflex S-105-10 (Bayer), Stepanpol PNI 10 (Stepan), Priplast 3196 (Uniqema).

Relatively low molecular weight diols may also be used, often in low concentrations. Examples include ethylene glycol, propylene glycol (such as 1,2-propylene glycol and 1,3-propylene glycol), butanediol, pentanediol, hexanediol, octanediol, decane diol, dodecanediol, chloropentanediol, glycerol monallyl ether, glycerol monoethyl ether, diethylene glycol, 2-ethylhexanediol, 1,4-cyclohexanediol. Alkanolamines such as triethanolamine, dialkylalkanolamine, such as dialkylethanolamine and/or dibutylethanolamine, or bis(O, O'-2-aminoethyl)ethyleneglycol may be used. Polyfunctional alcohols may also be used such as glycerol and derivatives, trimethylolpropane and alkoxylated derivatives, 1,4,6-octanetriol, 1,2,6-hexanetriol, 1,3,5-hexanetriol, pentaerythritol and alkoxylated derivatives, dipentaerythritol and alkoxylated derivatives, tripentaerythritol and alkoxylated derivatives, sorbitol, sucrose, glucose, fructose or other sugar alcohols, propoxylated ethylene diamine, propoxylated diethylene triamine and/or Mannich polyols, as well as per-fluoroalkyl functional polyols.

In addition, the prepolymers may be prepared with urea segments by the reaction of a polyisocyanate with a polyamino or a polymercapto-containing compound; these may be used alone or blended in smaller amounts with polyols.

Suitable polyamino compounds include the Jeffamine™ range such as the polyoxypropylene diamines available as Jeffamine™ D230, Jeffamine™ D400 and Jeffamine™ D2000 as well as Jeffamine™ EDR-148, a triethylene glycol diamine. Examples of alkyl diamines include ethylene diamine, 1,4 butyl diamine, 1,6 hexanediamine. Examples of alkyl substituted branched diamines include 2-methyl-1,5-pentane diamine, 2,2,4-trimethyl-1,6-hexane diamine and 2,4,4-trimethyl-1,6-hexane diamine. Cyclic diamines may also be used, such as isophorone diamine, cyclohexane diamine, piperazine and 4,4'-methylene bis(cyclohexyl amine), 4,4'-2,4'- and 2,2'-diaminodiphenylmethane, tris(2-aminoethyl)amine. Furthermore, primary and/or secondary amines, such as aliphatic amines, such as 1,2-diamino ethane, oligomers of 1,2-diamino ethane, such as diethylene triamine, triethylene tetramine or pentaethylene hexamine. Suitable examples of alkanolamines include 2-(methyl amino) ethanol, 2-amino-2-methyl propanol, N-methyl diethanol amine, diethanol amine, N-(2-aminoalkyl)dialkanolamine such as N-(2-aminoethyl) diethanolamine and/or N-(2-aminoethyl)dibutylamine, cyclic structures such as 1-(2-aminoethyl)piperazine, as well as trialkanolamine, in particular triethanolamine, triisopropanolamine, or higher primary and secondary alkanolamines.

Suitable polymercaptocompounds are aliphatic thiols including alkane, alkene and alkyne thiols having at least two or more —SH groups, or at least one thiol and at least one hydroxyl group. Examples are mercaptoethanol, mercaptopropanol, mercaptobutanol, mercaptophenol, thioglycerol and di- and tri-mercaptopropionate esters of poly(oxyethylene) diols, tris(3-mercaptopropionate), pentaerythritol tetrakis(3-mercaptopropionate), tripentaerythritol octakis(thioglycollate), dipentaerythritol hexakis(thioglycollate)

For making isocyanate free compositions, compounds capable of reacting with the terminal isocyanate groups on the prepolymers and containing at least one olefinically unsaturated group are preferably hydroxy-, amino- and/or thio-functionalised olefinically unsaturated monomers. Typically these are hydroxyl, amine and/or thiol functionalised (meth-)acrylates, vinyl silanes, vinyl ethers and/or styrene derivatives. Examples of such suitable functionalized monomers include, but are not limited to 2-hydroxyethyl(meth)acrylate, 2-hydroxypropyl(meth)acrylate, 3-hydroxybutyl(meth)acrylate, diethylaminoethyl(meth)acrylate, dimethylaminoethyl (meth)acrylate, N-Methylolallylcarbamate, N-[3-(Dimethylamino) propyl](meth-)acrylamide, N-[3-(Dimethylamino) ethyl](meth-)acrylate, N,N-[3-Chloro-2-hydroxypropyl)-3-dimethylammonium-propyl] (meth-)acrylamide chloride, hydroxy-propyleneglycol(meth-)acrylate, hydroxyethyleneglycol(meth-)acrylate, o-, m-, p-hydroxy styrene, o-, m-, p-hydroxy methylstyrene, and/or hydroxyl alkyl vinyl ethers, such as 4-hydroxyl butyl vinylether, hydroxyl cyclohexyl vinyl ether or mixtures of two or more thereof. Other examples include pentaerythritol triacrylate and dipentaerythritol pentaacrylate.

Preferred compounds capable of reacting with the terminal isocyanate groups on the prepolymers are those containing at least one acrylate group. If compounds capable of reacting with the terminal isocyanate groups on the prepolymers are those containing styrene and/or vinyl ether groups then it is advantageous for the polyurethane backbone to contain unsaturated groups, e.g., via polyester polyols derived from maleic or fumaric acid.

The poly(meth)acrylate segments may be linear or branched with a wide range of Tg values, between about $-48°$ C. and $105°$ C., more preferably about $-20°$ C. to $85°$ C. and more preferably $15°$ C. to $85°$ C. The polymer comprises copolymerised alkyl (meth)acrylic monomers. Suitable comonomers include the $C_1$ to $C_{12}$ esters of methacrylic and acrylic acids including, but not limited to methyl methacrylate, ethyl methacrylate, n-propyl, iso-propyl methacrylate, n-butyl methacrylate, isobutyl methacrylate, n-hexyl methacrylate, n-octyl methacrylate 2-ethylhexyl methacrylate, dodecyl(lauryl)methacrylate, cyclohexylmethacrylate, norbornyl methacrylate or the corresponding acrylates. Mixtures of compatible (meth)acrylate monomers may also be used. Methacrylic and acrylic comonomers based on esters of methacrylic and acrylic acid with poly(ethylene glycol) and/or poly(propylene glycol and/or glycol ethers may also be used.

Functional comonomers may also be used in the poly (meth)acrylate, e.g., acid, amine, hydroxyl or epoxy functionalised (meth)acrylic comonomers although this list is not exclusive. Suitable acid functional comonomers include, but are not limited to, methacrylic acid and acrylic acid. Suitable hydroxyl functionalised comonomers that can be incorporated include, but are not limited to, 2-hydroxyethylmethacrylate, 2-hydroxylpropyl methacrylate and 2-hydroxybutyl methacrylate or the corresponding acrylates. Suitable amine-functionalised comonomers include, but are not limited to, dimethylaminoethyl methacrylate, diethylaminoethyl methacrylate or the corresponding acrylates.

Virtually any ethylenically unsaturated monomer may be utilized as a comonomer in the compositions of the present invention. Other additional vinyl comonomers that may be used include the vinyl esters (e.g., vinyl acetate and vinyl propionate); vinyl ethers; esters of crotonic acid, maleic acid, fumaric acid and itaconic acid; styrene; alkyl styrenes; acrylonitrile; butadiene; etc., as well as comonomers thereof.

The poly(meth)acrylate is made by free-radical polymerisation techniques well-known in the art using azo or peroxide initiator in solvent, bulk, suspension or emulsion polymerisation. Suspension polymerisation is useful as it is a facile way of providing polymer in bead form for subsequent formulation into the hot melt coating composition.

The poly(meth)acrylate may be blended with the polyurethane in any stage of its preparation. If the poly(meth)acrylate is blended with the isocyanate free polyurethane after it is completely made (method 1), this will likely result in a physical blend with polyurethane segments. Alternatively, the poly (meth)acrylate may be blended with the polyol mixture before the isocyanate functional prepolymer intermediate is made (method 2). In accordance with one embodiment of the invention, the hydroxyl containing poly(meth)acrylate may function as the polyol component, in which case, it is optional that no additional polyol may be required. Alternatively, the poly(meth)acrylate may be blended with the isocyanate functional prepolymer intermediate after it is made and before the reaction of isocyanate and compounds capable of reacting with the terminal isocyanate groups also containing at least one olefinically unsaturated group (method 3).

If the poly(meth)acrylate does not contain functional groups capable of reacting with isocyanate then methods 2 and 3 will likely result in a physical blend. If the poly(meth) acrylate polymer does contain functional groups capable of reacting with isocyanate then methods 2 and 3 will result in covalent bonding between the poly(meth)acrylate and polyurethane segments.

The poly(meth)acrylate polymer may optionally contain olefinic functional groups capable of polymerization under UV conditions. This would typically be achieved by making a functional (meth)acrylic polymer precursor and then reacting with functional monomers that contain at least one complementary reactive functional group and at least one olefinic functional groups capable of polymerization under UV conditions. For example, an acrylic copolymer containing copolymerized (meth)acrylic acid would be reacted with an unsaturated hydroxyl functional monomer such as 2-hydroxyethyl acrylate or glycidyl acrylate. In alternative examples, an acrylic copolymer containing copolymerized 2-hydroxy ethyl acrylate would be reacted with unsaturated acrylic acid or isocyanato acrylate. In an alternative method, a melt processable acrylic polymer with pendant olefinic groups can be made by copolymerizing monofunctional (meth)acrylic monomers with polyfunctional (meth)acrylic monomers provided that a sufficient concentration of chain transfer agent is used to prevent crosslinking.

In the case of using a (meth)acrylic polymer containing olefinic functional groups capable of polymerization under UV conditions, the polyurethane segments may also contain olefinic functional groups capable of polymerization under UV conditions. Alternatively, it is not necessary for the polyurethane segments to contain functional groups capable of polymerization under UV conditions, provided that the overall polymer component contain at least one functional group polymerisable under UV radiation. In the latter case, then the isocyanate free polyurethane can be made by making the isocyanate functional prepolymer intermediate as previously described but then further reacting with a monofunctional hydroxyl, amine or thiol containing compound which does not contain functional groups polymerisable via UV radiation. The resulting polyurethane contains no residual isocyanate groups.

It is possible to add the (meth)acrylic monomers to the polyurethane in any part of its preparation and polymerise the monomers in situ, i.e., the monomers are added either to the poloyls or added to the isocyanate functional prepolymer or added to the final polyurethane and the acrylic polymerization subsequently performed. However, this is not preferred due to difficulty in controlling the chemistry.

Embodiments of the invention may also comprise an oligomeric component. The oligomeric component will have a Mn of from 500 to 5,000 g per mole and have at least two functional groups polymerisable under UV radiation. Preferred are multifunctional oligomers containing acrylate or methacrylate functionality. Examples of useful oligomers that can be used in the practice of the invention are urethane acrylates and methacrylates, polyester acrylates and methacrylates, epoxy acrylates and methacrylates, acrylic acrylates and methacrylates, melamine acrylates and methacrylates. Preferred are epoxy acrylates, polyester acrylates or urethane acrylates. Examples of epoxy acrylates include, but are not limited to Ebecryl 600 or Ebecryl 1608 (Cytec Surface Specialties), CN104 or CN109 (Sartomer), Genomer 2254 (Rahn). Examples of polyester acrylates include, but are not limited to Ebecryl 846 or Ebecryl 450 (Cytec Surface Specialties), CN203 or CN2505 (Sartomer), polyester acrylate 03-849 (Rahn). Examples of urethane acrylates include, but are not limited to Ebecryl 265 or Ebecryl 1290 (Cytec Surface Specialties), CN922 or CN9276 (Sartomer), urethane acrylate 00-022 (Rahn). In one embodiment the oligomeric component comprises one or more acrylate or methacrylate functionalised oligomers. The total oligomer component will generally be present in amounts from 1 to 40 wt %, preferably 5-40%, more preferably 5-30%, more preferably 5-25%

Embodiments of the invention may also contain a monomer component. The monomer component useful in the practice of the invention will preferably have Mn of from 100 to 1,000 g per mole and at least one functional group polymerisable under UV radiation. Preferably, the monomers chosen have high functionality to produce a high crosslink density after curing and/or have a cyclic structure to produce high Tg after curing. These monomers typically have a higher viscosity compared to standard monomers used in low viscosity UV lacquers at room temperature, such as hexanediol diacrylate or tripropyleneglycol diacrylate.

Representative examples include:

KAYAUARD MCD—monofunctional cycloaliphatic monomer with molecular weight of 162 g per mole—having the structure:

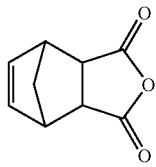

SR833S: Tricyclodecane dimethanol diacrylate—difunctional cycloaliphatic monomer with molecular weight 304 g per mole—having the structure:

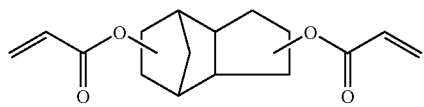

SR368: Tris(2-hydroxyethyl)isocyanate triacrylate—trifunctional monomer with molecular weight of 422 g per mole—having the structure:

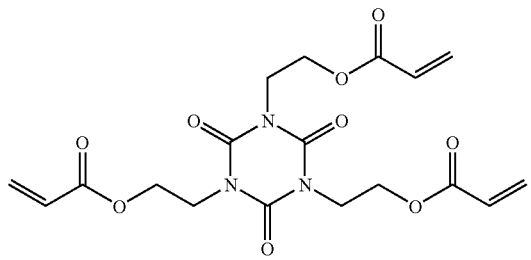 [SMILES: C=CC(=O)OCCn1c(=O)n(CCOC(=O)C=C)c(=O)n(CCOC(=O)C=C)c1=O]

SR355: D-trimethylpropane tetraacrylate—tetrafunctional monomer with molecular weight 482 g per mole, having the structure:

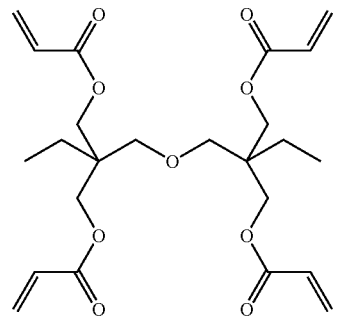 [SMILES: C=CC(=O)OCC(CC)(COCC(CC)(COC(=O)C=C)COC(=O)C=C)COC(=O)C=C]

and

DPHA: dipentaerythritol penta/hexya acrylate—penta/hexafunctional monomer with molecular weight 566 g per mole, having the structure:

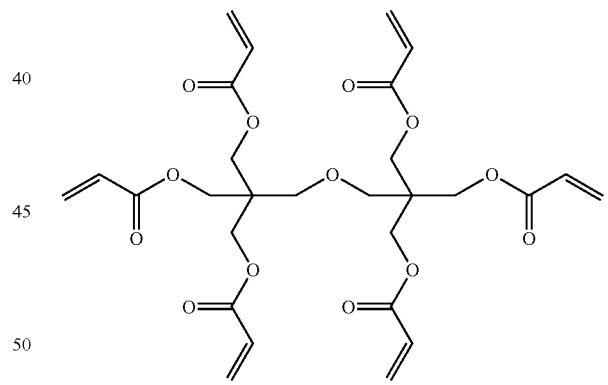

In one embodiment of the invention, the monomer component will generally be present in amounts of from 1-40 wt %, preferably 5-40%, more preferably 5-30%, more preferably 5-25%.

The composition of the invention must contain a photoinitiator, which can be a free-radical initiator and/or a cationic initiator. Photoinitiators are preferably employed in concentrations ranging from about 0.05 to about 5 wt.-%, in particular in amounts ranging from about 0.2 to about 3 wt.-%, and more preferably from about 0.5 to about 1.5 wt.-%. The concentration is chosen based on the thickness of the application of the uncured radiation curable composition and are preferably used in the least amount necessary to obtain effective initiation of cure at the line speed of the process.

Type 1 photoinitiators, which are photofragmentation initiators, include benzoin alkyl ethers, benzil ketals, acyloxime esters, and acetophenone derivatives, including dialkoxyacetophenones, hydroxyl alkyl ketones, morpholinoketones, chlorinated acetopheneones, acylphosphine oxides and acyl phosphonates. Type 2 photoinitiators, which are hydrogen abstraction photoinitiators, include benzil and derivatives, benzophenone and derivatives, and thioxanthones. Specific examples of photoinitiators are benzyldimethyl ketal, bis(2,6-dimethoxy benzoyl)(2,4,4-trimethyl pentyl)phosphine-oxide, 2-hydroxy-2-methyl-1-phenyl-1-propanone, diphenyl(2,4,6-trimethylbenzoyl) phosphine oxides, 1-hydroxycyclohexyl phenyl ketone, 2-benzyl-2-(dimethylamino)-1-)4-(4-morpholinyl)phenyl-1-butanone, isopropylthioxanthone, α-α-dimethoxy-α-phenyl-acetophenone, 2-methyl-1-4-(methylthio)phenyl-2-(4-morpholinyl)-1-propanone, 2,2-diethoxyacetophenone, 2-hydroxy-1-4-(hydroxyethoxy)phenyl-2-methyl-1-propanone. In one embodiment of the invention, combinations of photoinitiators may be used to achieve the best possible cure of coating compositions, e.g., to ensure both surface cure and depth cure. The cure process is generally more efficient in the absence of oxygen, for example, in the presence of nitrogen, so a greater amount of photoinitiator is generally required in the presence of oxygen. Commercial examples of photoinitiators include Irgacure 819, 907, 2959, 651, 184, 369 and 1700 and Darocur 1173, available from Ciba Speciality Chemicals as well as Genocure LBP available from Rahn and Esacure KIP150 available from Sartomer.

Examples of cationic photoinitiators include sulfonium salts, iodonium salts and onium salts. Preferred among such cationic photoinitiators are sulfonium salts. Particularly preferred among sulfonium salts are aromatic sulfonium salts. Specific examples thereof include triphenylsulfonium salts, methyldiphenylsulfonium salts, dimethylphenylsulfonium salts, diphenylnaphthylsulfonium salts and di(methoxynaphthyl)methylsulfonium salts. Preferred among such aromatic sulfonium salts are aromatic sulfonium salts with hexafluorophosphate ions ($PF_6^-$) or hexafluoroantimonate ions ($SbF_6^-$) as counter ions. Specific examples include triphenylsulfonium hexafluorophosphate, methyldiphenyl-sulfonium hexafluorophosphate, dimethylphenyl-sulfonium hexafluorophosphate, diphenylnaphthyl-sulfonium hexafluorophosphate, di(methoxynaphthyl)methyl-sulfonium hexafluoro-phosphate and triarylsulfonium hexafluoro-antimonate (e.g., Cyracure UVI6976).

Furthermore, it is also possible to use photoinitiators which are polymer-bonded photoinitiators. Preferably, they are obtained by reacting a low molecular mass photoinitiator having a functional group capable of reacting with an isocyanate, such as an amino or a hydroxyl group, with a high molecular mass compound having at least one isocyanate group. Alternatively, they are obtained by reacting functional groups on the photinititator capable of reacting with complementary functional groups on (meth)acrylate monomers, followed by copolymerisation into poly(meth)acrylate polymers.

The preferred photoinitiators are able to initiate free-radical polymerization of olefinically unsaturated double bonds upon exposure to radiation. Typical radiation includes UV, Infrared, Near Infrared, X-ray, microwave and/or electron radiation as well as sonication. Preferred is UV radiation with a wavelength to match the absorption profile of the photoinitiators, which is preferably from about 260 to about 480 nm.

The UV curable compositions of the invention may also comprise one or more fillers. Both organic and inorganic fillers, as well as combinations thereof, may be used in the practice of the invention. The fillers may be sub micron in particle size, e.g., 1-1000 nm or larger than 1 micron, e.g., 1-250 micron. Inorganic fillers include silica and organic fillers include PTFE, polyolefins and modified polyolefins. The fillers may be used predispersed in monomers which are polymerisable under UV radiation. Commercial examples of inorganic fillers and organic fillers are the HighLink NanOG (Clariant) range of silica with typical particle size 10-50 nm and the Ceraflour range of polyolefin micronised waxes (BYK Chemie) with typical particle size 4-15 µm, respectively. The coating composition of the invention will typically comprise up to about 10% of an organic and/or an inorganic filler.

Other additives and combinations may also, optionally, be used. These additives include photosynergists, ultraviolet absorbers, hindered amine light stabilizers, adhesion promoters, fillers, tackifiers, plasticizers, flow aids, wetting aids, rheology modifiers, dyes, pigments, nucleating agents and antioxidants (such as those available from Ciba Specialty Chemicals under the Irganox tradename). Although (meth) acrylic copolymers are desirable, other thermoplastic polymers that are compatible with the formulations of the invention may be used, e.g., copolymers of ethylene and vinyl acetate or amorphous polyolefins. These include, but are not exclusive to copolymers rich in other unsaturated monomers such as styrene, alkyl styrenes, butadiene, vinyl acetate, vinyl propionate, vinyl chloride, vinylidene chloride, acrylonitrile, vinyl ethers, vinyl acetals, etc. Additive component may be used in amounts typically up to 20 wt %.

In one embodiment, the UV curable compositions will comprise a polymer component with Mn>2,000 g per mole comprising polyurethane and/or poly(meth)acrylate segments and at least one functional group polymerisable under UV radiation, an oligomeric component with Mn=500 to 5,000 g per mole and at least two functional groups polymerisable under UV radiation, and at least one photoinitiator. In one embodiment, the coating composition comprises polyurethane and poly(meth)acrylate segments. These compositions will typically comprise comprising 60%-95% of the polymer component, 5-40% of the oligomeric component and 0.1-10% of the photoinitiator.

In another embodiment, the UV curable compositions will comprise a polymer component with Mn>2,000 g per mole comprising polyurethane and/or poly(meth)acrylate segments and at least one functional group polymerisable under UV radiation, a monomer component with Mn=100 to 1,000 g per mole and at least one functional group polymerisable under UV radiation, and at least one photoinitiator. In one embodiment, the coating composition comprises polyurethane and poly(meth)acrylate segments. These compositions will typically comprise 60%-95% of the polymer component, 5-40% of the monomer component and 0.1-10% of the photoinitiator.

In yet another embodiment, the UV curable compositions will comprise a polymer component with Mn>2,000 g per mole comprising polyurethane and/or poly(meth)acrylate segments and at least one functional group polymerisable under UV radiation, an oligomeric component with Mn=500 to 5,000 g per mole and at least two functional groups polymerisable under UV radiation, a monomer component with Mn=100 to 1,000 g per mole and at least one functional group polymerisable under UV radiation, and at least one photoinitiator. In one embodiment, the coating composition comprises polyurethane and poly(meth)acrylate segments. These compositions will typically comprise 30%-90% of the polymer component, 5-40% of the oligomeric component, 5-40% of the monomer component and 0.1-10% of the photoinitiator.

The coating compositions of the invention will generally be formulated to have a melt viscosity of below 20,000 cP at the coating composition application temperature, more typically below 10,000 cP at the coating composition application temperature. The isocyanate free radiation curable hot melt coating composition of the invention will typically have an application temperature below 120° C. when applied to a substrate surface, preferably below 110° C. and typically in the range 70° C. to 110° C.

The invention also provides a process for making a radiation curable coating composition comprising mixing polyether polyol, polyester polyol and acrylic polymer, reacting the mixture with polyisocyanate, reacting remaining isocyanate with a compound which contains at least one isocyanate reactive functional group and at least one functional group reactive under radiation, and mixing oligomers, monomers, fillers, photoinitiators and other additives.

The invention also provides coated substrates and a method of coating a substrate. The coating method of the invention comprises applying at least one layer of the isocyanate free radiation curable hot melt coating composition on to a substrate and irradiating with UV light. The isocyanate free radiation curable hot melt coating composition may be applied using a roller, doctor blade, slot nozzle or by spraying. The temperature of the coating composition will typically be below 120° C. at the time of its application to the substrate. In one embodiment the temperature of the coating composition will be below 110° C. at the time of its application to the substrate. In yet another embodiment, the temperature of the coating composition will range from about 70° C. to about 110° C. at the time of its application to the substrate.

The isocyanate free radiation curable coating composition may be applied to a substrate and irradiated with UV light either after each coating or after all coatings. In one embodiment, following application of the radiation curable hot melt coating composition, either before or after irradiation with UV light, at least one radiation curable UV lacquer is applied on top of the radiation curable hot melt coating, and then irradiated with UV light. UV lacquers that may be used in the practice of the invention include lacquers comprising one or more polyester acrylate, polyether acrylate, epoxy acrylate, urethane acrylate oligomer and/or one or more acrylate functional monomers. In one embodiment, the UV lacquer is a fluid at ambient temperature and applied at ambient temperature.

Radiation curing may be achieved, e.g., by one or more UV lamps placed in series, where all of the curing of the coating composition takes place via the UV exposure which is complete within a few seconds. The UV lamps can be either microwave lamps or arc lamps typically provided by suppliers well known in the industry, e.g., Fusion, Nordson, UltraLight AG, etc.

Depending on the substrate and coating, it may be necessary to heat the substrate or the coating during any stage of the application, e.g., the substrate may be heated before application of the coating or the coated substrate may be heated before UV curing. This is typically achieved by infra-red radiation. It is also optional to contact the surface of the coated substrate using a smoothing contact roller at any stage of application, e.g., an optionally heated metal nip roller after UV curing.

Another embodiment of the invention is directed to articles of manufacture comprising a radiation cured coating that is permanently adhered at least one substrate surface of the article. Coated articles of the invention include but are not limited to furniture, countertops, flooring panels, doors, architectural panels, decorative panels, automotive applications. The coating composition may be used in textile bonding applications (carpet and clothing), in the manufacture of footwear (shoes), and in coating of ceramics and tiles. By way of example, substrates that may be coated comprise wood, plastic, metal, glass ceramic, veneer, fibre board, foam and fabric.

Substrates of the invention will typically comprise one or more layers of the isocyanate free radiation curable coating composition, wherein the radiation curable hot melt composition has a thickness in the range of 5 to 200 µm. In one embodiment the substrate comprises one layer of the isocyanate free radiation curable hot melt composition with a thickness of 5-200 µm and one layer of UV curable lacquer with a thickness of 5-50 µm.

The packaging materials used to package the isocyanate free coating composition of the invention, and methods of packaging do not require prevention of moisture ingress. Likewise, pumping of the compositions of the invention from the packaging container to the application equipment does not require prevention of moisture ingress. Moisture may penetrate the composition without causing any adverse effects.

The following Example is presented for purposes of illustration and not limitation.

EXAMPLES

Samples 1-6 were prepared as follows.

Voranol P2000, Dynacoll 7380, Elvacite 2013, Irganox 3052 and polywax 1000 were mixed together at 120° C. until homogeneous and stirred under vacuum for 1 hour. Thereafter, and at a temperature of approximately 100° C., the vacuum was released and Desmodur W was added to the mixture. Following a reaction time of 2 hours, 4 drops of DBTDL catalyst were added and left to react for a further 1 hour. Next, the remaining isocyanate functional groups of the acrylic modified IPDI functional polyurethane prepolymer were completely reacted with various low molecular weight hydroxyl functional molecules for 1 hour. Once this reaction was completed, the oligomers (urethane acrylate and polyester acrylate) were added. Following the compatibility of oligomers, various monomers were incorporated into the mixture. Finally, the photoinitiators (Darocur 1173+Irgacure 2959) were added by mixing into the formulation. Formulations are shown in Table 1.

Voranol P2000 is a polyether polyol supplied by Dow.
Dynacoll 7380 is a polyester polyol supplied by Degussa.
Elvacite 2013 is an acrylic copolymer supplied by Lucite International.
Desmodur W is isorphorone diisocyanate supplied by Bayer.
DBTDL is dibutyl tin dilaurate supplied by Sigma Aldrich.
Bisphenol A diglyceroldiacrylate was supplied by Sigma Aldrich.
PPG acrylate was supplied by Cognis.
Urethane acrylate 00-022 oligomer was supplied by Rahn.
Polyester acrylate LR-410 oligomer was supplied by Synthesis Espagnola.
SRS33S, SR355 and SR368 monomers were supplied by Sartomer.
DPHA monomer was supplied by Cytec Surface Specialties.
Kayahard MCD monomer was supplied by CBC Ltd.

Darocur 1173 and Irgacure 2959 photoinitiators were supplied by Ciba.

Irganox 3052 antioxidant was supplied by Ciba.

Polywax 1000 nucleating agent was supplied by Baker Petrolite.

Ceraflour 998 filler was supplied by BYK.

TABLE 1

| Material | 1 | 2 | 3 | 4 | 5 | 6 |
|---|---|---|---|---|---|---|
| Voranol P2000 | 28.3 | 30.52 | 29.1 | 29 | 27 | 27 |
| Dynacoll 7380 | 6.3 | 6.78 | 6.5 | 6.4 | 6.13 | 6.13 |
| Elvacite 2013 | 16.6 | 21 | 17.2 | 17 | 16.4 | 16.1 |
| Irganox 3052 | 0.27 | 0.3 | 0.28 | 0.3 | 0.27 | 0.27 |
| Polywax1000 | 0.04 | 0.05 | 0.05 | 0.05 | 0.045 | 0.045 |
| Desmodur W | 5.2 | 5.7 | 5.4 | 5.4 | 5.15 | 5.15 |
| PPG acrylate | 7.4 | 8 | 0 | 2 | 7.23 | 7.23 |
| BisphA diglyceroldiacrylate | 0 | 0 | 3.9 | 2.7 | 1.8 | 1.8 |
| Urethane acrylate 00-022 | 8.1 | 8.8 | 8.4 | 8.3 | 7.9 | 7.9 |
| Polyester acrylate LR-410 | 6.2 | 6.78 | 6.47 | 6.4 | 6.12 | 6.12 |
| SR833S | 7.5 | 8.14 | 7.7 | 7.7 | 7.3 | 7.3 |
| SR368 | 0 | 5.42 | 0 | 0 | 0 | 0 |
| DPHA | 8.6 | 0 | 8.8 | 8.8 | 8.4 | 8.4 |
| KAYAHARD MCD | 5.0 | 0.0 | 5.2 | 5.0 | 4.9 | 4.9 |
| Ceraflour 998 | 0 | 0 | 0 | 0 | 0.5 | 0.8 |
| 50/50 Darcour 1173/Irgacure 819 | 0.3 | 0.4 | 0.76 | 0.76 | 0.8 | 0.8 |
| viscosity at 120° C. (cP) | | | 9400 | 4850 | 1500 | 1750 |
| viscosity at 100° C. (cP) | | 4600 | | | 3700 | 3950 |
| % viscosity increase per hour at 100° C. | | 5.1 | | | 6.3 | |
| hardness (sec), dose 1 | $39.0^{41}$ | $18.5^B$ | $46.6^B$ | | $41.0^B$ | $43.0^B$ |
| hardness (sec) + lacquer, dose 1 | $53.3^{42}$ | | | | | $60.0^{42}$ |
| hardness (sec), dose 2 | | | $62.6^B$ | | | |

Melt Viscosity:

The melt viscosity was measured using a Brookfield Viscometer model RVDV-1+ with a Model 74R temperature controller and Thermosel unit, using spindle no. 27. The adhesive was heated in an oven to 100° C. or 120° C. Upon reaching this temperature, 10.5 g of the adhesive was weighed into a disposable aluminium viscometer tube. The tube was inserted into the viscometer and left to equilibrate to a constant viscosity reading at 100° C. or 120° C. for 20 minutes. Table 1 shows that the melt viscosity of the inventive materials is relatively low, often below 5000 cP at 100 or 120° C.

Thermal Stability:

400 g of material were then applied to a roll-coater machine supplied by Web processing with a material temperature of 100° C. in the nip between a rubber and metal roller, and at ambient temperature & humidity. At every hour and over a period of 6 hours, some material was removed, the melt viscosity was remeasured as above and the % increase in viscosity noted. Table 1 shows that the inventive materials 2 and 5 have a low increase in viscosity, i.e., much less than 10% per hour. Conventional commercially available moisture curable reactive hot melt adhesives, e.g., PUR-FECT 9021 will increase in viscosity much more rapidly under the same conditions and produce a crosslinked gel (i.e., >500,000 cP) typically within 2 hours.

Coating and Curing of Adhesives:

The applied adhesives were coated on to different substrates and exposed to UV light on a conveyor. 2 different doses (Table 2) were used:

TABLE 2

| | UVA | UVB | UVC | UVV |
|---|---|---|---|---|
| dose 1 (mJ/cm²) | 357 | 387 | 74 | 106 |
| dose 2 (mJ/cm²) | 759 | 847 | 176 | 238 |

In Table 1

A1. Method consisted of infra-red heating the substrate, applying the coating using a 1 meter wide metal roller coater, passing the coated substrate under UV unit containing two 80 W/cm Fe doped medium pressure Hg lamps and then passing under a hot nip roller. The coating was applied at a thickness of 20 grammes per square meter (gsm) on to wooden substrates.

A2. Like A1 but with the addition of a UV lacquer application station between the hot melt applicator and before the UV unit. The UV lacquer was applied with a coating weight between 7 to 15 gsm.

B Method consisted of applying the coating to veneer substrates with a coatweight of 50 gsm using a hand held coating block, followed by passing the coated veneer under an IST UV unit containing two 200 W/cm Fe doped medium pressure Hg lamps and a conveyor belt.

Hardness:

Pendulum hardness. This method evaluates hardness by measuring the damping time of an oscillation pendulum. The pendulum rests with 2 stainless steel balls on the coating surface. A physical relationship exists between oscillation time, amplitude and the geometric dimensions of the pendulum. The viscoelastic behavior of the coating determines its hardness. When the pendulum is set into motion, the balls roll on the surface and put pressure on the coating. Depending on the elasticity, the damping will be stronger or weaker. If there are no elastic forces, the pendulum will damp stronger. High elasticity will cause weak damping. A König pendulum has been used.

Table 1 shows that a variety of hardness levels can be achieved by either (a) using different coating compositions of the invention, e.g., compare samples 2, 3, 5, 6 or (b) by using different UV dose, e.g., sample 3 or (c) by using a UV lacquer layer on top of a coating layer of the invention, e.g., sample 1 and sample 6.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

We claim:

1. An isocyanate free, radiation curable hot melt coating composition comprising a solvent-free radiation curable polymer component; an oligomer component; a photoinitiator and optionally a monomer component, wherein
   the polymer component comprises poly(meth)acrylate segments and polyurethane segments, has a Mn>2000 g per mole and has at least one functional group polymerisable under UV radiation,
   the oligomeric component has Mn from 500 to 5000 g per mole and contains at least two functional groups polymerisable under UV radiation,
   the monomer component has Mn from 100 to 1000 g per mole and contains at least one functional group polymerisable under UV radiation, and
   the coating composition is solid at room temperature and has a melt viscosity greater than about 3700 cP at the coating composition application temperature.

2. The isocyanate free coating composition of claim 1 further comprising the monomer component.

3. The isocyanate free coating composition of claim 1 comprising a solvent-free radiation curable hot melt composition comprising the polymer component, the oligomer component, the monomer component and the photoinitiator.

4. The isocyanate free coating composition of claim 1 where the polymer component has a Mn of from 5,000 to 100,000 g per mole.

5. An isocyanate free coating composition comprising a solvent-free radiation curable hot melt composition consisting essentially of 60%-95% of a polymer component, 5-40% of an oligomeric component and 0.1-10% of a photoinitiator, wherein
   the polymer component comprises poly(meth)acrylate segments and polyurethane segments, has a Mn>2000 g per mole and has at least one functional group polymerisable under UV radiation and
   the oligomeric component has Mn from 500 to 5000 g per mole and contains at least two functional groups polymerisable under UV radiation.

6. The isocyanate free coating composition of claim 1 comprising 30%-90% of the polymer component, 5-40% of the oligomeric component, 5-40% of the monomer component and 0.1-10% of the photoinitiator.

7. The isocyanate free coating composition of claim 1 wherein the polymer component is the reaction product of poly(meth)acrylate polymer containing acid or hydroxyl functional groups.

8. The isocyanate free coating composition of claim 1 further comprising a filler.

9. The isocyanate free coating composition of claim 1 where the melt viscosity is below 20,000 cP at the coating composition application temperature.

10. A method of coating a substrate comprising:
    providing the coating composition of claim 1 at room temperature in solid form;
    melting the coating composition; and
    applying the melted coating composition of claim 1 to a substrate, wherein the temperature of said isocyanate free coating composition is below 120° C. at the time of application to said substrate.

11. The method of claim 10 wherein the temperature of the isocyanate free coating composition is from about 70 to about 110° C. at the time of application to said substrate.

12. A substrate comprising a layer of the solvent-free radiation curable composition of claim 1.

13. The substrate of claim 12 further comprising a layer of a radiation curable lacquer.

14. A coated substrate comprising a layer of the solvent-free radiation curable composition of claim 1 which has been cured by exposure to UV radiation.

15. An article of manufacture, at least a portion of which comprises the coated substrate of claim 14.

16. The method of claim 10 further comprising allowing the melted coating composition to cool and solidify and exposing the coating composition to radiation to cure the coating composition.

17. A hot melt, isocyanate free, solvent-free coating composition comprising a solvent-free, radiation curable polymer component, an oligomeric component, a monomer component, and a photoinitiator, wherein
    the polymer component comprises poly(meth)acrylate segments and polyurethane segments, has a Mn>2000 g per mole and has at least one functional group polymerisable under UV radiation,
    the oligomeric component has Mn from 500 to 5000 g per mole and contains at least two functional groups polymerisable under UV radiation,
    the monomer component has Mn from 100 to 1000 g per mole and contains at least one functional group polymerisable under UV radiation, and
    the coating composition has a melting point of about 70° C. to about 110° C. and the melt viscosity of the coating composition is greater than about 3700 cP at the coating composition application temperature.

18. The hot melt, isocyanate free, solvent-free coating composition of claim 17 wherein the radiation curable polymer component does not contain allophanate groups.

* * * * *